United States Patent [19]

Sato

[11] 3,940,780
[45] Feb. 24, 1976

[54] LIGHT-INTERCEPTING DEVICE FOR CAMERAS HAVING FOCAL PLANE SHUTTERS

[75] Inventor: Akihiko Sato, Tokyo, Japan
[73] Assignee: Nippon Kogaku K. K., Tokyo, Japan
[22] Filed: Oct. 10, 1974
[21] Appl. No.: 513,863

[30] Foreign Application Priority Data
Oct. 16, 1973 Japan.............................. 48-119337

[52] U.S. Cl. ................ 354/241; 354/202; 354/288; 354/354
[51] Int. Cl.² ..................... G03B 9/28; G03B 17/00
[58] Field of Search .......................... 354/241–249, 354/287, 288, 226, 202, 277, 354

[56] References Cited
UNITED STATES PATENTS
2,664,800  1/1954  Mayo .................................. 354/246
FOREIGN PATENTS OR APPLICATIONS
15,460  6/1891  United Kingdom................. 354/245
234,508  11/1963  Austria ................................ 354/245
1,145,474  3/1963  Germany ............................ 354/246

*Primary Examiner*—Richard M. Sheer
*Assistant Examiner*—James LaBarre
*Attorney, Agent, or Firm*—Shapiro and Shapiro

[57] ABSTRACT

In a camera having a focal plane shutter, a light-intercepting device for preventing light from passing through the clearance between the shutter curtain and the camera body to strike the film comprises at least one pair of resilient, opaque, planar light-intercepting members each having a rectilinear edge portion at one end thereof. These members are supported either by the camera body or by a support frame separable from the camera body so that they are inclined relative to the shutter curtain with the rectilinear edge portions being parallel to the direction of movement of the shutter curtain and making line contact with one side of the shutter curtain near the opposite edges thereof. An additional pair of identical light-intercepting members may be provided for making line contact with the other side of the shutter curtain.

8 Claims, 3 Drawing Figures

LIGHT-INTERCEPTING DEVICE FOR CAMERAS HAVING FOCAL PLANE SHUTTERS

BACKGROUND OF THE INVENTION

1. Field of the Invention

This invention relates to a light-intercepting device in a single-lens-reflex camera having a focal plane shutter, and is more particularly directed to a device for preventing incoming light from passing through the clearance between the camera body and the shutter curtain to strike the camera film.

2. Description of the Prior Art

In single-lens-reflex cameras having a focal plane shutter, clearance is provided between the shutter curtain and the camera body to allow the shutter to move freely. When a camera having such construction is used in bright light, oblique light rays passed through the lens are reflected within the light-transmitting frame of the camera body and may pass through the clearance to strike the film in the camera when the shutter is in closed position, causing the surface of the photographic film to be fogged. This problem is particularly evident when camera lens interchange is effected in direct sunlight.

A first prior art proposal for overcoming this problem has been to attach a light-intercepting material, such as Telemp, to the camera body within the clearance space or to the outer surface of the mirror box with the material being urged against the shutter curtain. However, the engagement of the material with the shutter curtain substantially increases the frictional resistance to movement of the shutter curtain, which in turn has caused the velocity of the shutter curtain to be reduced and also to be somewhat irregular. A second prior art proposal has been to support light-intercepting members of flexible and opaque thin films such that pocket-like or deformed cylindrical bulges in the films are urged against the surfaces of the shutter curtain at the upper and lower portions thereof, thereby reducing frictional drag on the shutter curtain.

Both of these prior art proposals are unsatisfactory because they involve complicated configurations which result in poor manufacturing efficiency. Moreover, in the first proposal, the flapping of the shutter curtain which occurs during shutter movement prevents close contact from being maintained between the shutter curtain and the light-intercepting material, thereby reducing the light-intercepting effect. With respect to the second proposal, in order to reduce the frictional drag on the shutter curtain, the deformed cylindrical shape of the light-intercepting members requires that the area of contact be reduced. To compensate for the resulting reduction in the light-intercepting effect, the light-intercepting members would have to be brought into considerably stronger surface contact with the shutter curtain in order to provide complete light interception. Moreover, the degree of contact of such members with the surfaces of the convexo-concave shutter curtain is low.

In accordance with a third prior art proposal, the front and rear surfaces of the shutter curtain at the upper and lower edges thereof are held by and between light-intercepting members which comprise opaque rubber-coated films which are bent into a V-shape having an angle of 120° or 140°, for example. One leg of each bent film is fixedly secured to the mirror box or to the camera body in a position such that the end of the other leg of the film is urged against the shutter curtain. The light-intercepting members make contact with the shutter curtain only by virtue of their being bent and therefore lack sufficient positive force for bearing against the shutter curtain. As a result, the light-intercepting members tend to be forced back by the shutter curtain and thus fail to provide close contact with the shutter curtain. Furthermore, light-intercepting members of this type have poor durability, because the force with which the film bears against the shutter curtain decreases with use.

SUMMARY OF THE INVENTION

It is an object of the present invention to eliminate the above-noted disadvantages and to provide a light-intercepting device for a focal plane shutter which has simple construction and excellent durability and which provides complete light-interception with minimal drag on the shutter curtain during the movement thereof.

The light-intercepting device in accordance with the invention employs at least one pair of resilient, opaque, substantially planar light-intercepting members, such as rubber-coated sheets of cloth, each member having a substantially rectilinear edge portion at one end thereof. The light-intercepting members are supported in inclined position relative to the shutter curtain with their rectilinear edge portions parallel to the direction of movement of the shutter curtain and making line contact with the shutter curtain near opposite edges thereof. The light-intercepting members may be supported in these positions by being secured to inclined surfaces provided by the camera body itself or by being mounted in inclined opposite end portions of a support frame which is separable from the camera body. In the preferred embodiment, two pairs of such light-intercepting members are employed for contacting both sides of the shutter curtain near the opposite edges thereof.

BRIEF DESCRIPTION OF THE DRAWINGS

The invention will be further described with reference to the accompanying drawing, which illustrates preferred and exemplary embodiments, and wherein.

DESCRIPTION OF THE PREFERRED EMBODIMENTS

Figure 1:
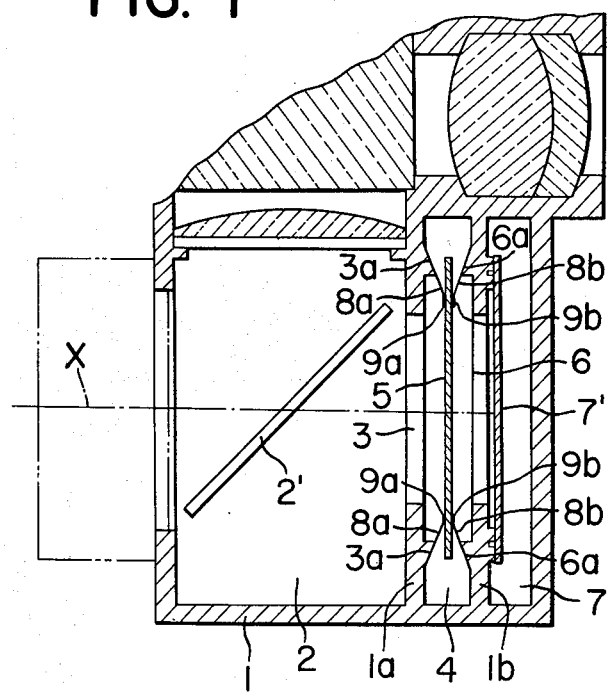
FIG. 1 is a vertical cross-sectional view of a camera employing a first embodiment of the light-intercepting device constructed in accordance with the invention.

A first embodiment of the light-intercepting device in accordance with the invention will be described with reference to FIG. 1, which is a vertical cross-sectional view of a single-lens-reflex camera having a focal plane shutter, this view being taken along a plane which includes the optical axis X of the camera.

Camera body 1 includes a mirror compartment or box 2 containing a mirror 2' supported for pivotal movement at its upper end. The mirror is shown intersecting the optical axis to direct incoming light rays into the view finder of the camera, and means (not shown) is provided for automatically swinging the mirror up away from the optical axis upon actuation of the shutter release mechanism to enable the incoming light rays to strike the film, as is well known. A first picture-taking opening 3 in wall 1a of the camera body at the rear of mirror box 2 opens into a shutter compartment 4 which contains the shutter curtain or blind 5. Substantial clearance is provided between the shutter curtain and the camera body so that the shutter can move freely in the shutter compartment. A second picture-taking opening 6 in wall 1b of the camera body at the rear of the shutter compartment opens into a film compartment 7 which contains a photographic film 7' supported adjacent opening 6.

The light-intercepting device in accordance with the invention for preventing incoming light from passing through the clearance between the shutter curtain and the camera body, and more particularly to prevent incoming light from striking the film when the shutter is closed, includes at lease one pair of thin, resilient, opaque, planar light-intercepting members 8a, which preferably comprise sheets of cloth coated with highly cold-resistant rubber, such as silicone rubber. Each of these light-intercepting members, which are preferably rectangular in shape, provides a longitudinally extending rectilinear edge portion 9a at one end thereof which has a length greater than the longitudinal dimension of the picture-taking openings 3 and 6. In the embodiment of the light-intercepting device illustrated by FIG. 1, a substantial area of each of the light-intercepting members is suitably mounted on the respective one of a pair of spaced, inclined surfaces 3a provided by side wall 1a of the camera body, such as by being affixed thereto by a suitable adhesive. These inclined surfaces, which lie on opposite sides of picture-taking opening 3, slope away from wall 1a and toward the shutter curtain to hold the light-intercepting members in inclined positions relative to the shutter curtain with their longitudinal rectilinear edges 9a parallel to the direction of movement of the shutter curtain and in line contact with one side of the shutter curtain near the opposite edges thereof. The width of the light-intercepting members is selected such that the rectilinear edge portions 9a make only light contact with the shutter curtain, thereby insuring that the members intercept any stray light entering the shutter compartment while at the same time minimizing frictional resistance to movement of the shutter curtain.

In the preferred form of the light-intercepting device, and as illustrated in FIG. 1, an additional pair of light-intercepting members 8b identical to light-intercepting members 8a are mounted on respective inclined surfaces 6a which are provided by wall 1b of the camera body. Light-intercepting members 8b are supported thereby in inclined relation with respect to the shutter curtain and with their rectilinear edge portions 9b parallel to the direction of movement of the shutter curtain and in line contact with the other side of the shutter curtain near respective opposite edges thereof.

Any incoming light reflected within mirror box 2 and passing through picture-taking opening 3 into shutter compartment 4 will be blocked by light-intercepting members 8a. Moreover, even if some light should stray into the shutter compartment, light-intercepting members 8b will prevent that light from entering film compartment 7. Thus, when the shutter curtain is in closed position, the light-intercepting device of the invention is effective to prevent any incoming light from striking the film and causing fogging of the film.

Figure 2A:
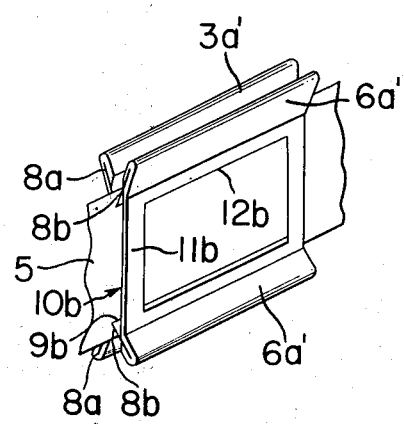
FIG. 2A is a perspective view of a second embodiment of the light-intercepting device, this view showing the relationship of the device to a shutter curtain.
Figure 2B:
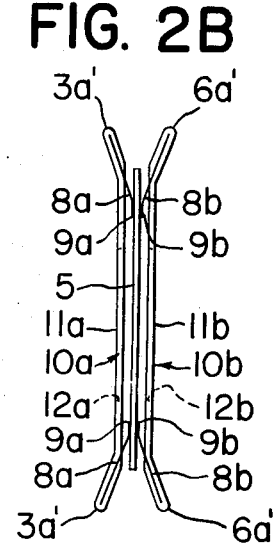
FIG. 2B is a side elevational view of the light-intercepting device and shutter curtain of FIG. 2A.

FIGS. 2A and 2B illustrate a second embodiment of the light-intercepting device wherein light-intercepting members 8a and 8b, instead of being mounted on inclined surfaces provided by the walls of the camera body, are mounted in support frames 10a and 10b, respectively, which are separable from the camera body. Referring to FIG. 2B, substantial portions of light-intercepting members 8b at the ends opposite the ends having rectilinear edges 9a are mounted in respective inclined opposite end portions 6a' of support frame 10b, these end portions being inclined relative to the shutter curtain 5, as shown in FIG. 2B. Referring to FIG. 2A, end portions 6a' of the support frame are joined together by a rectangular planar portion 11b having a rectangular opening 12b therein which is slightly larger than picture-taking openings 3 and 6 in the camera body. In similar fashion, light-intercepting members 8a are mounted in and supported by respective inclined end portions 3a' of support frame 10a, these end portions being joined together by a rectangular planar portion 11a having a rectangular opening 12a therein with the same dimensions as opening 12b in support frame 11b.

Referring to FIG. 2B, when the support frames together with the light-intercepting members are inserted into the shutter compartment 4 of a camera on opposite sides of the shutter curtain 5, the planar rectangular portions 11a and 11b of the support frames are parallel to shutter curtain 5, while rectangular openings 12a and 12b in the support frames are aligned with picture-taking openings 3 and 6 in walls 1a and 1b of the camera body. Moreover, the rectilinear longitudinal edge portions 9a and 9b of the light-intercepting members make line contact with opposite sides of the shutter curtain in the same manner as the light-intercepting members in the first embodiment illustrated by FIG. 1. By mounting the light-intercepting members in support frames which are separable from the camera body and receivable by the shutter compartment, instead of mounting the light-intercepting members directly on the walls of the camera body, the degree of fixity of the light-intercepting members is increased and the manufacturing efficiency is improved.

Although the preferred embodiments show two pairs of light-intercepting members disposed on opposite sides of the shutter curtain, a single pair of light-intercepting members may be employed on one side of the shutter curtain to provide sufficient light interception.

In the light-intercepting devices constructed in accordance with the invention, the light-intercepting members are planar and have substantial areas secured to the support surfaces or mounted in the end portions of the support members so that the resiliency of the light-intercepting members themselves maintains the rectilinear edge portions of the members in contact with the shutter curtain. This ensures close contact between the light-intercepting members and the shutter curtain during movement of the latter. Moreover, flapping of the light-intercepting members is eliminated so that a complete light-intercepting effect is provided. Furthermore, the fact that the light-intercepting members make line contact with the shutter curtain in the direction of shutter movement ensures close contact therebetween and reduces the force applied by the light-intercepting members against the sides of the shutter curtain, thereby minimizing the frictional resistance to movement of the shutter curtain and increasing the durability of the light-intercepting device. Also, each light-intercepting member comprises a planar sheet which may be simply mounted on the respective support surfaces with great savings in manufacturing time and cost.

It is believed that the advantages and improved results furnished by the light-intercepting device of the invention will be apparent from the foregoing description of several preferred embodiments thereof. Various changes and modifications may be made without departing from the spirit and scope of the invention, as sought to be defined in the following claims.

I claim:

1. A light-intercepting device in a camera having a pair of picture-taking openings provided in a camera body and a focal plane shutter curtain situated between the picture-taking openings, the device preventing light from passing through the clearance between the shutter curtain and the camera body, the device comprising:

a pair of resilient, opaque, planar light-intercepting members each having a rectilinear edge portion, the edge portion having a length greater than the dimension of the picture-taking opening parallel to the direction of movement of the shutter curtain; and support means for supporting each of said light-intercepting members, the rectilinear edge portion of each light-intercepting member being in resilient engagement with the shutter curtain, and an area of each light-intercepting member spaced from the rectilinear edge portion being fixedly secured to said support means.

2. A light-intercepting device as set forth in claim 1, wherein the support means comprises means for supporting the light-intercepting members in inclined position relative to the shutter curtain.

3. A light-intercepting device in accordance with claim 2, wherein the support means comprises inclined surfaces provided by the body of the camera, a substantial area of each light-intercepting member being mounted on a respective one of the inclined surfaces.

4. A light-intercepting device as set forth in claim 2, wherein the support means comprises a support frame which is separable from the camera, the support frame having a pair of inclined opposite end portions for supporting respective light-intercepting members.

5. A light-intercepting device as set forth in claim 1, wherein the light-intercepting members comprise rubber-coated sheets of cloth.

6. A light-intercepting device as set forth in claim 1, wherein the rectilinear edge portions of the pair of light-intercepting members make line contact with one side of the shutter curtain, and wherein the device further comprises an additional pair of said light-intercepting members and additional support means for supporting the additional light-intercepting members with their substantially rectilinear edge portions substantially parallel to the direction of movement of the shutter curtain and in line contact with the other side of the shutter curtain near respective opposite edges thereof.

7. A light-intercepting device as set forth in claim 3, wherein the rectilinear edge portions of the pair of light-intercepting members make line contact with one side of the shutter curtain, and wherein the device further comprises an additional pair of said light-intercepting members and additional inclined surfaces provided by the camera body, a substantial area of each additional light-intercepting member being mounted on a respective one of the additional inclined surfaces for supporting the additional light-intercepting members with their substantially rectilinear edge portions substantially parallel to the direction of movement of the shutter curtain and in line contact with the other side of the shutter curtain near respective opposite edges thereof.

8. A light-intercepting device as set forth in claim 4, wherein the rectilinear edge portions of the pair of light-intercepting members make line contact with one side of the shutter curtain, and wherein the device further comprises an additional pair of said light-intercepting members and additional support frame which is separable from the camera, the additional support frame having a pair of inclined opposite end portions for supporting the respective additional light-intercepting members with their substantially rectilinear edge portions substantially parallel to the direction of movement of the shutter curtain and in line contact with the other side of the shutter curtain near respective opposite edges thereof.

* * * * *